United States Patent [19]

Schindler

[11] Patent Number: 5,402,991
[45] Date of Patent: Apr. 4, 1995

[54] TUBE CONNECTOR FOR HEAP LEACH MINING, DRIP TUBE PERCOLATION SYSTEM, AND METHOD FOR CONNECTING SAME

[75] Inventor: Allen J. Schindler, Elko, Nev.

[73] Assignees: Newmont Mining Corporation; Newmont Gold Company, both of Denver, Colo.

[21] Appl. No.: 288,682

[22] Filed: Aug. 10, 1994

[51] Int. Cl.⁶ ............................................ C22B 3/00
[52] U.S. Cl. .................................. 266/101; 266/168; 266/170
[58] Field of Search .................. 266/101, 168, 170; 75/743

[56] References Cited

U.S. PATENT DOCUMENTS

| | | | |
|---|---|---|---|
| 4,473,532 | 9/1984 | Rose | 266/101 |
| 4,739,973 | 4/1988 | Herndon | 266/101 |
| 4,960,584 | 10/1990 | Brown | 266/101 |
| 4,968,008 | 11/1990 | Emmett | 266/101 |
| 5,005,806 | 4/1991 | Krauth | 266/101 |
| 5,030,279 | 7/1991 | Krauth | 266/101 |

*Primary Examiner*—Peter D. Rosenberg
*Attorney, Agent, or Firm*—Fred A. Keire; William J. Spatz

[57] ABSTRACT

A tube connector utilized in connecting a drip tube to a header pipe in a heap leach mining percolation system which provides for strength at the normally weak connection between the header pipe and the drip tube. The tube connector includes a housing providing a fluid passageway extending therethrough between a header pipe and a drip tube. A nipple section is formed at one end of the housing for accommodating the drip tube therearound which is of a relatively short length, and hence, a relatively short bending movement, to significantly reduce breakage of the connector during transportation. The connector further includes a driving collar engageable with the housing which includes a driving mechanism for locking the housing with respect to the header pipe and a compression mechanism for providing a compressive force on the drip tube to tension lock the drip tube between the nipple section and the collar; a tapered thread for connecting the drip tube connector to the header pipe also provides for reusable connection to a header pipe in which the threads in a connecting apperature heave been stripped.

47 Claims, 8 Drawing Sheets

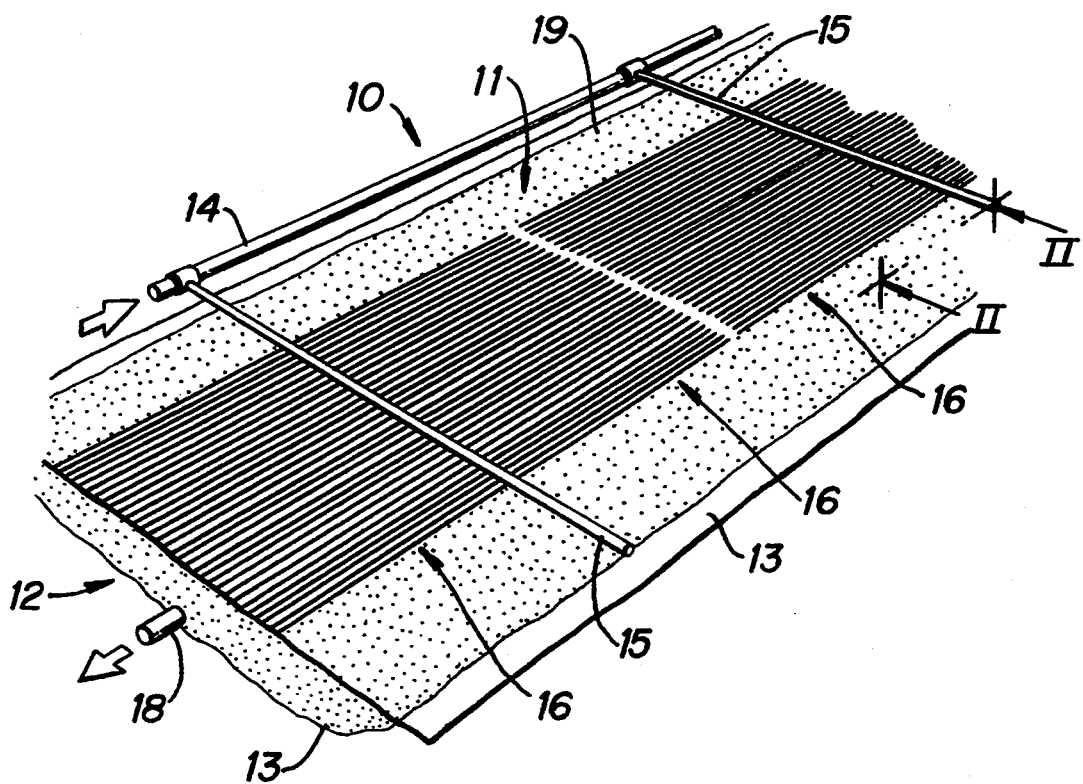
FIG_1
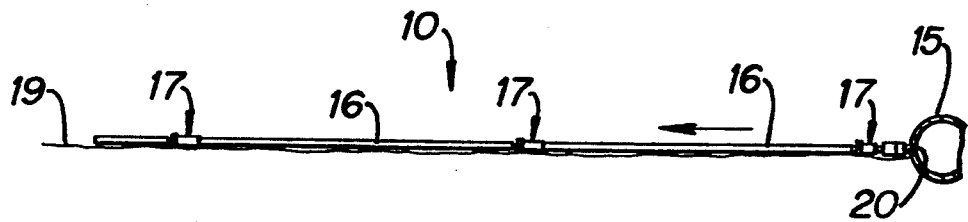
FIG_2

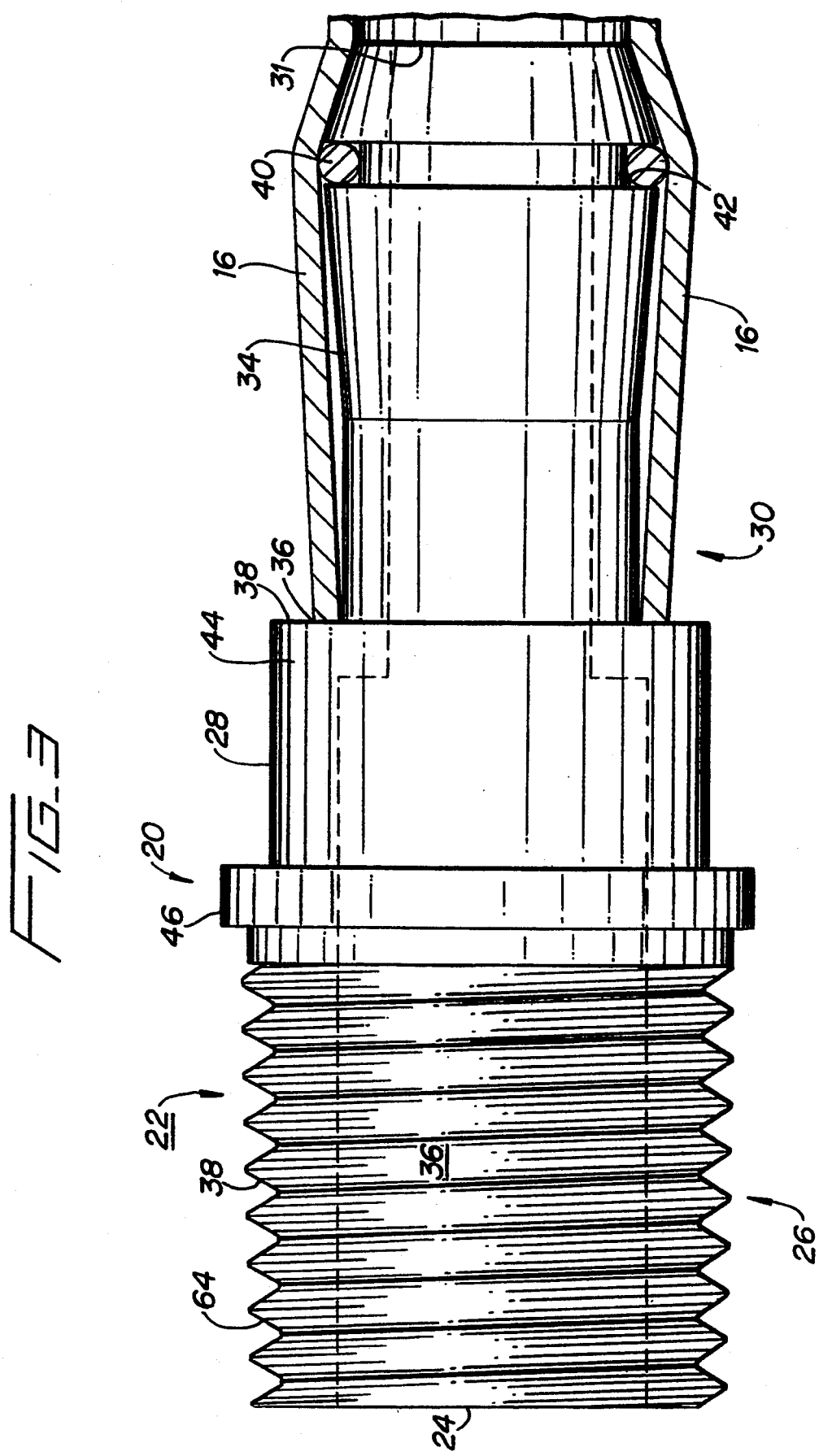

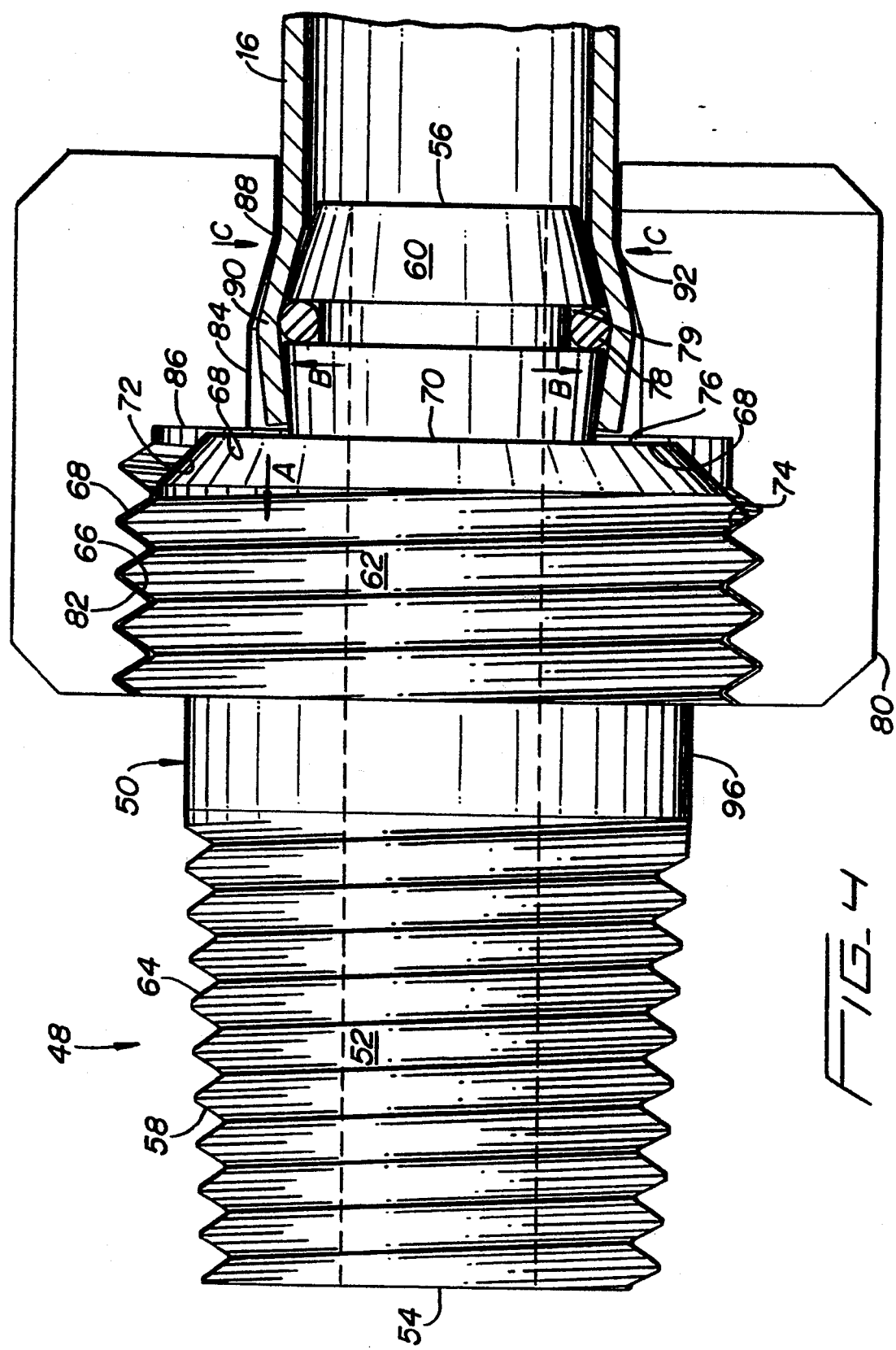

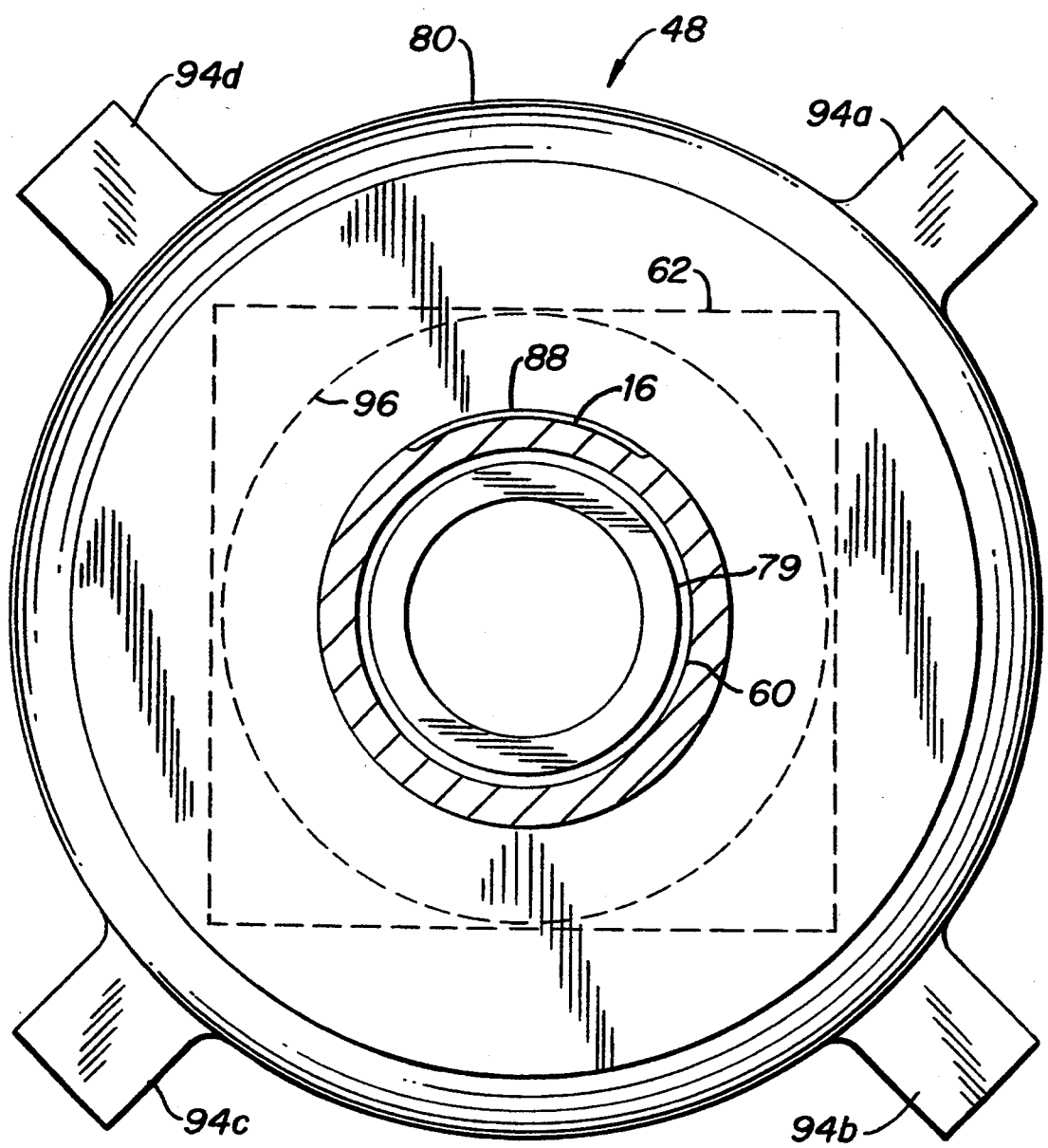

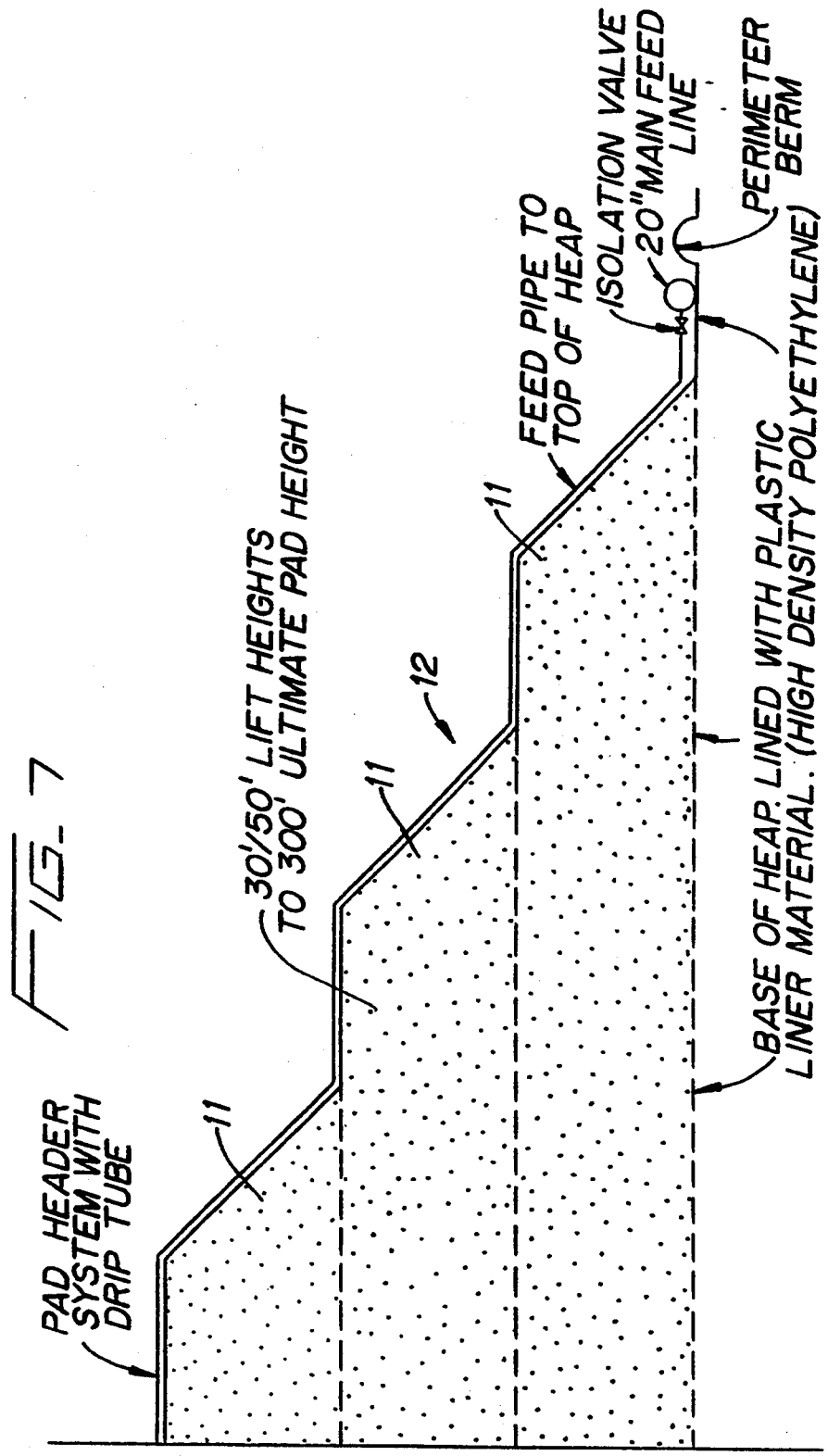

TUBE CONNECTOR FOR HEAP LEACH MINING, DRIP TUBE PERCOLATION SYSTEM, AND METHOD FOR CONNECTING SAME

FIELD OF THE INVENTION

The present invention relates to the field of tube connectors, and more particularly to the field of drip tube connectors for use in providing strength at the normally weak connections between piping used to distribute a leaching solution in a heap leaching operation and method for connecting the same between piping.

BACKGROUND OF THE INVENTION

Hydrometallurgy is the art of recovering metal from ores by first effecting solution of the metals in the form of a salt, separating the solution from the impoverished solid, and then decomposing the metallic salt in such a way as to cause precipitation of the metal in a state of comparative purity. The term "heap", as used in the art of hydrometallurgy, means a bed of run-of-mine, crushed, or granular low-grade ore that has been suitably spread over a prepared surface or "pad" that will ensure solution recovery. The pad is formed as an impervious base, such as by sheets of plastic film (e.g., polyethylene such as high density polyethylene sheet), asphalt and/or compacted clay. The ore is normally heaped onto each impervious pad to a depth of 10 to 50 feet, after the ore has been pre-crushed to sufficiently small size to enable the leaching solution to reach the metallic mineral particles contained in the ore. Run-of-the-mine (R.O.M.), i.e. not crushed ore, may also be used if the ore deposit is sufficiently brittle when it is broken-up in mining the ore and the particles are of sufficiently small size.

Lixiviation is the process effecting contact between the ore and the leaching solution. The process is normally accomplished by circulating the solution through the stationary ore mass, commonly known as "percolation".

In one conventional percolation system for heap leach mining operations, sprayers are mounted above the bed of crushed ore and the leaching solution distributed onto the bed of ore. In another conventional percolation system to alleviate the non-uniform and uncontrolled manner by which the leaching solution is distributed by the sprayers onto the ore bed a plurality of in-line emitters have been previously used to distribute the leaching solution over the bed in a more closely controlled and uniform manner than is possible with sprayers (see, for example, U.S. Pat. Nos. 4,960,584, 5,005,806, and 5,030,279).

BRIEF DESCRIPTION OF THE DRAWINGS

The following description, given by way of example, will best be understood in conjunction with the accompanying drawings in which:

FIG. 1 is a perspective view partially illustrating an ore bed composed of crushed metal-laden ore deposited on an impervious pad and having a prior art controlled percolation system;

FIG. 2 is an enlarged sectional view in elevation taken in the direction of arrows II—II in FIG. 1, illustrating a header pipe and a drip tube extending transversely from the header pipe according to prior art;

FIG. 3 is a front elevational view of a drip tube connector or emitter adapter of the prior art;

FIG. 4 is front elevational view of a preferred embodiment of the drip tube connector or emitter adapter of the present invention;

FIG. 5 is a front elevational view of the drip tube connector of FIG. 4;

FIG. 7 is a cross section of a typical leach pad.

FIG. 1 illustrates a conventional controlled percolation system 10 utilizing the in-line emitters. The percolation system is mounted on an upper surface of an ore bed or "heap" 11 composed of crushed or run-of-the-mine (R.O.M.) metal-laden ore, such as low-grade gold, silver, or copper bearing ores. The ore bed is deposited on a pad 12, shown, for example, in the form of one or more plastic sheets 13 which can be placed over an asphalt or compacted clay base.

Figure 6A:
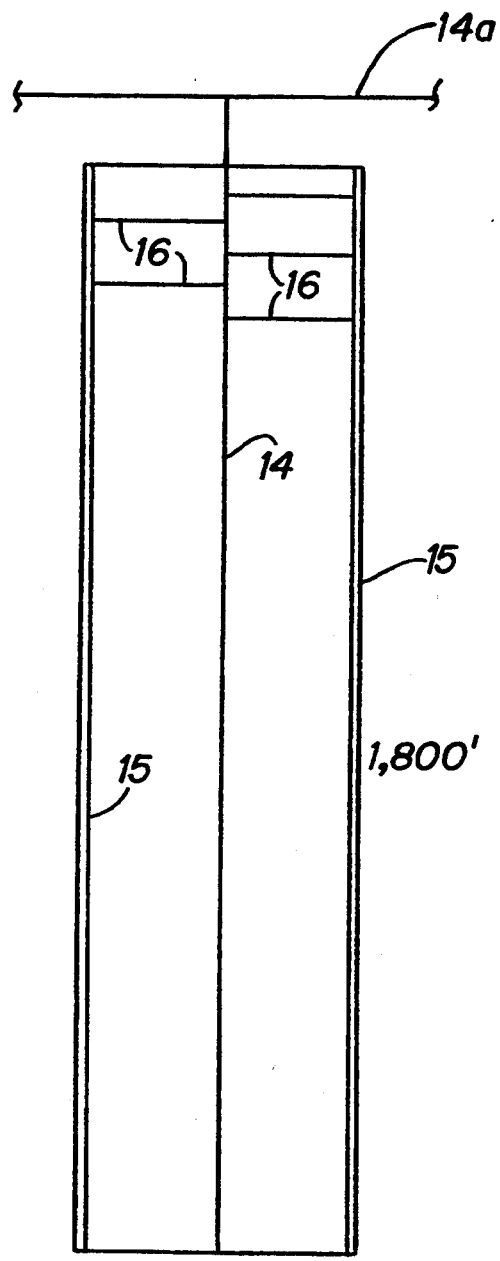
FIG. 6a illustrates a top view of a prior art pad with a pipe layout.

The percolation system 10 of FIG. 1 includes supply means in the form of a mainline pipe 14 and a plurality of header pipes 15 for conducting the liquid leaching solution to separate series of drip tubes 16, suitably connected to the header pipes 15. These drip tubes 16 are connected to one or both sides of a header pipe 15 to extend transversely therefrom. Since the drip tubes 16 are preferably composed of a flexible plastic tubing, such as low density polyethylene, drip tubes 16 will exhibit sufficient flexibility to at least generally conform to an irregular upper surface 19 of ore bed 11. Each drip tube 16 has a plurality of emitters 17 (see FIG. 2) secured thereon which function to emit and distribute the leaching solution into the ore bed 11 at a controlled and substantially uniform rate.

The connection between the header pipe and drip tube, of a heap leaching operation are normally weak and prone to breakage when moving pipe from one area of the ore bed to an unleached area. One such example of a prior drip tube connector is illustrated in FIG. 3.

As shown in FIG. 3, the prior drip tube connector 20 includes a first section 22 formed at the inlet end 24 of the adapter 20 which is comprised of a threaded section 26 and a collar 28 and a second nipple section 30 formed at the outlet end 31 of the adapter. As will be discussed in more detail below, a bore 36 is formed through the first and second sections 22 and 30, respectively, to allow the leaching solution to pass therethrough.

In the conventional drip tube connector arrangement of FIG. 3, external threading 38 is provided around threaded section 26 which has a standard pipe thread taper of approximately 1°. This external threading meshes with internal threading provided in the header pipe 15 to secure the adapter 20 with respect to the header pipe. In order to secure the adapter to the header pipe 15, the collar 28 must be turned by a wrench or similar tool.

At the outlet end 31 of the adapter, the drip tube 16, or alternatively, a conventional emitter, may be connected thereto. This drip tube 16 is pushed over the nipple section 34 until the leading edge 36 thereof is restrained from further movement by an abutment surface 38 formed in the collar 28. An 0-ring or the like 40 formed in a cylindrical recess 42 formed in the nipple section 34 urges the drip tube 16 outwardly adjacent to the inlet end 31. In order to secure the drip tube 16 to the nipple section 34, appropriate bracing such as a plastic compression collar is provided (not shown)

around the drip tube 16 near the leading edge 36 thereof.

Further, the region 44 of the collar 28 surrounding abutment surface 38 is thin and has sharp corners and a stepped inner diameter which, in turn, causes the bore 36 to be non-uniform between the respective inlet and outlet ends 24 and 31 of the adapter as the bore is wider at the inlet end 24 than at the outlet end 31.

In the drip tube connector of FIG. 3, the nipple portion 34 extends outwardly from the abutment surface 38 of collar 28 for approximately 1 inch. This length for the nipple portion 34 is required for assembly of the slip-lock collar 28 and is not required after assembly.

The drip tube connector of FIG. 3, however, has been found to be very susceptible to breakage during the pad piping process due to the exposed connection "nipple" 34 at the outlet end 31 that protrudes from the sides of the header pipe 15. In transporting the header pipe 15 as the heap is built up, i.e. from one section of the pad to the next, whether carried or pulled, such as by a fork lift, the connectors break off at the nipple section. The remaining threaded portion 26 must also be extracted prior to the installing a new drip tube connector. With the drip tube connector of FIG. 3, this process may need to be repeated hundreds of times on a single pad.

This prior drip tube connector of FIG. 3 is also disadvantageous in that in order to secure the first section 22 to the header pipe 15, a wrench must be utilized to rotate the collar 28. Since the collar cannot be hand-tightened in the field, it has found been that thread movement can result leading to unwarranted premature wear and leakage at the header pipe connection. It is therefore desirable to provide a collar assembly for an emitter adapter which can be hand-tightened in the field. Further, in the prior emitter adapter of FIG. 3, as aforementioned, the standard pipe taper of the external threads at the inlet end 24 is too "flat" as the thread angle is approximately 1°. This allows the shoulder section 46 to bottom out after minimal wear or plastic creep, which in turn, contributes to a loose and leaky connection with respect to the header pipe 15. The emitter adapter of FIG. 3 has also been found to be disadvantageous as the thin section 44 is formed with sharp corners and a stepped inner diameter thereby defining a region of increased stress greatly reduces this region's strength. As a result thereof, this region is susceptible to increased incidents of breakage.

OBJECTS OF THE INVENTION

Therefore, it is an object of the present invention to provide a drip tube connector which avoids the aforementioned disadvantages of the prior art. Another object of this invention is to provide a drip tube connector for use in a heap leach mining percolation system. It is a further object of this invention is to provide a drip tube connector which acts as a collar to provide strength at the normally weak connections between piping in a heap leach mining percolation system.

It is another object of this invention to provide a drip tube connector which is easily connectable and less susceptible to breakage.

An additional object of the invention is to provide a drip tube connector which includes a nipple having a reduced bending movement and shortened length and slip-lock collar which reduce stress upon transporting of the header pipes on repositioning (i.e., during transportation).

Still another object of this invention is to provide a drip tube connector having relatively large threads capable of threading engagement with the header pipes in a heap leach mining operation to absorb the bending forces of the connector, instead of absorbing the bending forces in the nipple section.

A further object of this invention is to provide a drip tube connector which can be secured with respect to the header pipes by hand-tightening.

An additional object of this invention is to provide a drip tube connector which reduces piping time by reducing the amount of man-hours required to replace broken connectors.

A further object of this invention is to provide a drip tube connector which includes a bore therethrough to carry the leaching solution which is of a design which alleviates stress rises and enhances the overall strength of the adapter.

A still further object is to provide for a new pipe assembly combination employing the novel drip tube connector.

Various other objects, advantages and features of the present invention will become readily apparent from the ensuing detailed description, and the novel features will be particularly pointed out in the appended claims.

SUMMARY OF THE INVENTION

In accordance with the present invention, a drip tube connector is provided for use in a heap leach mining percolation system. Additionally, a method of connecting a header pipe to a drip tube in a heap leach mining operation is also provided. Further, a new combination of a new percolation field layout with the novel drip tube connector or emitter adapter provides various advantages not enjoyed by the prior art.

The drip tube connector of the present invention includes a housing and a driving collar engageable with the housing. The housing provides a fluid passageway extending between the inlet and outlet ends thereof between the header pipe and the drip tube.

In accordance with one of the general objects of the present invention, the housing includes a nipple section formed at the outlet end thereof for accommodating the drip tube there around and which is of a reduced length. This reduced length, in turn, provides for a relatively short bending moment at the outlet end of the connector. As a consequence thereof, stress incurred at the nipple section as a result of moving the header pipes during transportation is reduced thereby leading to less breakage of the nipple section during transportation. Further, this shortened length of the nipple section reduces the potential of the connector being caught on another connector or pipe during transportation.

The housing of the drip tube connector of the present invention further includes a first threaded section at the inlet end thereof for threadably securing the housing with respect to the header pipe. In order to absorb the bending forces in the connector at the inlet end thereof, instead of at the outlet end, the first threaded section includes external threading of a relatively large diameter. The housing further includes a second threaded section positioned between the first threaded section and the nipple section which is threadably engageable with the driving collar.

In accordance with another object of this invention, the driving collar acts to provide strength at the normally weak connection between piping in a heap leach mining percolation system. Generally, the driving collar includes a driving mechanism for locking the housing with respect to the header pipe and, in addition, includes a compression mechanism for providing a compression force on the drip tube to tension lock the drip tube between the nipple section of the housing and the collar.

Upon rotation of the collar, the driving mechanism includes an inwardly extending driving shoulder surface capable of impinging upon an abutment surface of the second threaded section of the housing at a first point of contact. This, in turn, urges the housing rearwardly such that the first threaded section is threadably secured to the header pipe. Further, upon rotation of the collar, the compression mechanism of the collar applies a compression force to the drip tube at a second point of contact prior to the shoulder surface of the collar impinging upon the abutment surface at the first point of contact.

The drip tube connector herein also includes a fluid passageway in the form of a straight bore through the housing of uniform diameter to carry the leaching solution. Since the bore is of a uniform diameter, stress risers are alleviated and overall strength of the adapter is enhanced.

In accordance with one aspect of this invention, the drip tube connector can be secured with respect to the header pipe by hand-tightening. In accordance therewith, the driving collar includes a plurality of lugs integrally formed with the collar and extending outwardly therefrom to provide a suitable hand gripped for tightening.

DETAILED DESCRIPTION OF A PREFERRED EMBODIMENT AND DRAWINGS

Referring now to the drawings, wherein like reference numerals are used throughout, and in particular to FIGS. 4 and 5 thereof, there is illustrated a preferred embodiment of a tube connector or emitter adapter 48 in accordance with the present invention. The drip tube connector of the present invention is primarily utilized to connect the drip tube to the header pipe in a heap leach mining operation for dispensing a leaching solution in a substantially uniform and controlled flow into an ore bed. Although the present invention is described in the environment of a heap leach mining percolation system, it will be further appreciated by one of ordinary skills in the art that the teachings of the present invention are equally applicable to other environments wherein strength is required at a normally weak connection between two pipes or tubes. For simplification, the following description is set out in the environment of a heap leach mining percolation system, such as that shown in FIGS. 1 and 2 herein.

As is shown in FIG. 4, the drip tube connector of the present invention includes basically a tubular housing 50 and a driving collar 80 threadably engageable with the housing 50 and rotatable with respect thereto. The housing 50 includes a fluid passageway in the form of a straight bore 52 leading from the inlet end 54 of the housing 50 to the outlet end 56. The bore 52 is in fluid communication with the header pipe 15 at the inlet end 54 and with the drip tube 16 at the outlet end 56 such that the leaching solution may pass from the header pipe 15 through the bore 52 into the drip tube 16. The housing 50 is comprised of three sections, namely, a first threaded section 58 at the inlet end 54 of the housing, a nipple section 60 at the outlet end 56 of the housing 50, and a second threaded section 62 provided between the first threaded section 58 and nipple section 60.

In accordance with one aspect of the present invention, the drip tube connector herein is designed to significantly reduce breakage of the connectors during repositioning or transportation of the header pipes. In accordance therewith, the nipple section is of a reduced length, preferably, approximately 0.40 inches, and accommodates the drip tube 16 therearound. This reduced length of the nipple section 60 reduces the stress imparted upon this section when the header pipes are bent during repositioning as a result of the nipple section having a relatively short bending moment. Advantageously, this reduced " nipple" length also reduces the potential of the overall drip tube connector 48 catching on other connectors or pipes provided in the heap leach mining percolation system during transportation.

Further, in the drip tube connector 48 of the present invention, the bending forces are not primarily absorbed within the nipple section 60 of the housing 50. As is set forth below, the first threaded section 58 has been designed to primarily absorb the bending forces therein and provide increased strength to the connector. First, in order to increase the strength of the overall drip tube connector 48, the first threaded section 58 has a wall thickness from 0.25 to 0.30 inches. Second, the bending forces are primarily absorbed within the external threading 64 provided around first threaded section 58 as the external threads are of a relatively large diameter and have a thread angle of preferably approximately three degrees. These external threads 64 threadably secure the first threaded section 58 of the housing 50 to the header pipe 15. The increased thread angle of the external threads 64 also provides for better sealing of the first threaded section 58 with respect to the header pipe 15. This tapered thread design employing preferably a three degree thread angle also allows drip tube connector 48 of the present invention being utilized in situations where the header pipe threads have been damaged or stripped.

As is shown in FIG. 4, in contrast to the connector of FIG. 3, the second threaded section 62 has a outer diameter greater than the outer diameter of either the first threaded section 58 or nipple section 60. In order to threadably engage the second threaded section 62 with respect to the driving collar 80, second external threads 66 are provided along the outer peripheral of the second threaded section 62. These external threads 66 are capable of meshing engagement with internal threads 82 provided in the inner chamber 84 of the driving collar 80 such that the driving collar 80 is reliably retained with respect to the housing 50 and the collar 80 is capable of rotating relative thereto. These second external threadings 66 are formed of a sufficiently large diameter with approximately a 1° thread angle, i.e. fairly straight such that additional bending forces of the connector are also transmitted therethrough instead of at the nipple section 60 of the housing 50.

As will be discussed in further detail below, the second threaded section 62 also includes a cylindrical abutment surface 68 provided along the leading edge 70 of the second threaded section 62. As is shown in FIG. 4, this abutment surface 68 extends outwardly from the connection between the second threaded section 62 and nipple section 60. The purpose of the abutment surfaces will be explained in more detail below.

The design of the second threaded section 68 also provides for stress relief for the external threads 66. In order to accomplish this result, second threaded section 62 includes a generally cylindrical chamfered edge 72 provided between abutment surface 68 and the external threads 66 of the second threaded section 62. As a result of this chamfered edge, as bending forces are applied to the nipple section 60 of the connector, less stress is encountered by the first or leading thread 74 of the external threads 66 as the stress is more evenly distributed throughout the external threads 66.

In accordance with another aspect of the invention, the driving collar 80 acts to provide strength at the normally weak connection between the header pipe 15 and drip tube 16. The driving collar 80 of the drip tube connector 48 of the present invention includes a driving mechanism for locking the housing 50 with respect to the header pipe 15 and a compression mechanism for providing a compression force on the drip tube 16 to provide locking of the drip tube 16 between the nipple section 60 and the collar 80.

More particularly, the driving mechanism of the collar 80 includes an inwardly extending annular driving shoulder surface 86 formed along inner chamber 84 and extending inwardly of the internal threads 82. In the rest position of the collar, a gap is defined between the shoulder surface 86 and abutment surface 68 of second threaded section 62 of approximately 0.01 inches. However, upon rotation of collar 80 with respect to housing 50, the shoulder section 86 impinges upon the abutment surface 68 at a first point of contact (represented by reference numeral 76 in FIG. 4) of the second threaded section 62 such that the housing 50 is urged rearwardly in the direction of arrow A in FIG. 4. In this manner, the first threaded section 58 of the housing is reliably secured and appropriately sealed to the header pipe 15.

The collar section 80 also cooperates with the nipple section 60 to tightly tension lock the drip tube 16 between the collar 80 and the nipple section 60. More specifically, as shown in FIG. 4, a gasket 78, preferably in the form of an 0-ring, is provided in a cylindrical recess 79 provided in the nipple section 60. This gasket means is thus capable of urging the drip tube outwardly from the nipple section 60 in the direction of arrows B in FIG. 4, particularly at the raised section 90 of the drip tube 16.

In conjunction therewith, the inner chamber 84 of the collar includes a compression mechanism which includes a generally inwardly depending inclined surface 88 of the inner chamber 84 which applies a compression force to the drip tube 16 in the direction of arrows C as shown in FIG. 4. Thus, a compression force is applied by the collar 80 at a second point of contact 92 adjacent to the outlet end 56 to provide for tension locking of the drip tube between the nipple section 60 and the collar 80. Since the tube is primarily loaded near the outlet end 56 of the nipple section 60, significant less bending forces are introduced into the nipple section thereby further reducing the chances of breakage of the nipple section 60.

As is shown in FIG. 4, since the drip tube 16 is urged outwardly by means of the gasket 78, virtually no gap exist between the drip tube and the nipple section 60 and collar 80 prior to driving the collar 80. In contrast, as aforementioned, prior to driving the collar 80, a gap of approximately 0.01 inches is present between the shoulder surface 86 and abutment surface 68 of the second threaded section 62. Due to this design, upon driving the collar 80, an interference fit of the drip tube 16 occurs at the second point of contact 92 prior to the shoulder surface 86 impinging upon the abutment surface 68 of second threaded section 62 to secure the housing to the header pipe 15.

In order to provide an enhanced locking effect upon the plastic drip tube 16, the driving collar 80 is made of a relatively strong material, such as a high density polyethylene or polypropylene. This composition of the collar also serves to protect the relatively thin nipple section 60.

In order to enhance the strength of the drip tube connector 48 of the present invention, the bore 52 is formed of a uniform diameter, preferably approximately 0.345 inches, throughout the first threaded section 58, nipple section 60, and second threaded section 62 of the housing 50. As a result of this straight bore design, unwarranted stress risers encountered in non-uniformed bores, such as in the connector of FIG. 3, are removed.

In accordance with another aspect of the present invention, the driving collar 80 also includes mechanism for hand-tightening the housing 50 with respect to the header pipe 16. As is best shown in FIG. 5, this hand tightening mechanism includes a plurality of lugs, such as 94a, 94b, 94c, and 94d, integrally formed with the collar 80 and extending outwardly therefrom to provide a suitable hand grip for tightening. In addition, the first threaded section 58 includes a relatively smooth cylindrical body 96 adjacent to the second threaded section 62 (see FIG. 4) which can be turned by a wrench in those situations wherein further tightening of the drip tube connector is required.

The present invention also provides a method for connecting a header pipe and a drip tube in a heap leach mining percolation system. This method will be readily appreciated by one of ordinary skill in the art based upon the above description of apparatus for the drip tube connector 48 of the present invention. However, a summary of this method follows. The fluid passageway or straight bore 52 of the housing 50 is placed between the header pipe 15 and the drip tube 16. The drip tube 16 is accommodated around the nipple section 60 formed at the outlet end 56 of the housing. The driving collar 80 is then engaged with the housing 50. Upon rotation of the collar, the housing 50 is locked with respect to the header pipe 15 and a compression force is supplied on the drip tube 15 to lock the drip tube 15 between nipple section 60 and the collar 80.

As a result of the drip tube connector or emitter adapter of the present invention and the method of connecting a connector to the header pipe and drip tube set forth herein, breakage of the connectors during transportation is significantly reduced. As such, the present invention reduces piping time, which, in turn, reduces the amount of man-hours required to replace broken connectors. Additionally, the threaded protective driving collar 80 not only serves as a driver to seal the housing with respect to the header pipe, but also serves as the locking mechanism to hold the drip tube 16 in place between the housing and the collar.

FIG. 6a illustrates in top vie a prior art piping layout such as shown in FIG. 1, but in greater detail. In FIG. 6a the total length of the pad or cell is about 1,800 feet. A pair of header pipes 15 of about three inches in diameter are on opposite sides of a main line pipe 14a. The main line pipe 14a may be about six inches in diameter and diminish in size away from the main feed line 14b which is about 20 inches in diameter.

In the prior art ore loading and subsequent piping layouts, the pads were filled in 1800'×150' sections.

Thereafter the leaching solution would be piped while a next section of about 1800′×150′ were filled. As a consequence, a large time lapse would occur between the build-up of the next section and its leaching and the leaching of the previous section.

As a consequence of the lag time, large variations in production would occur because of the variations in ore compositions making it more difficult to control leaching and needed leaching solution composition.

Figure 6B:
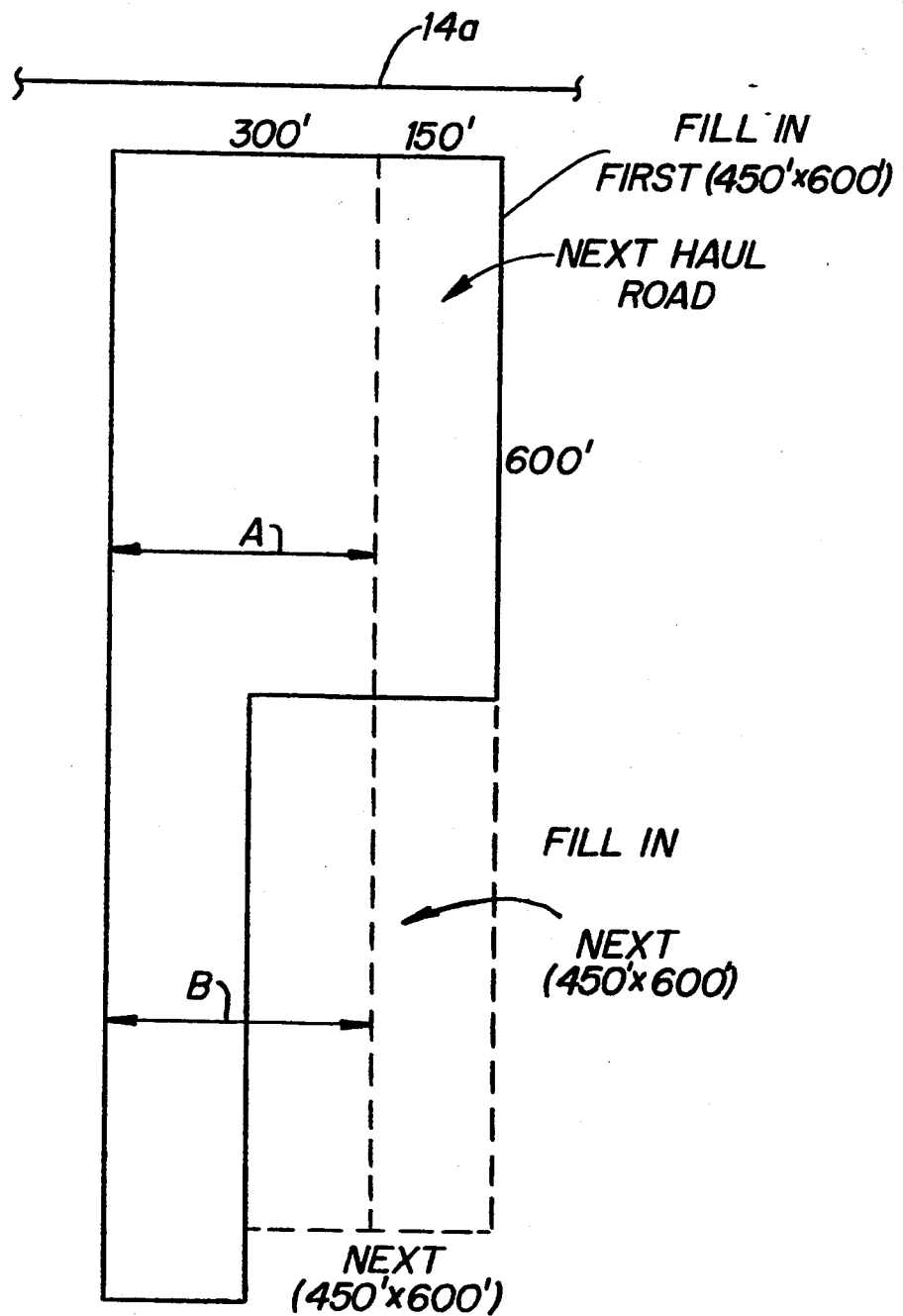
FIG. 6b and 6c illustrate a top view of a pad or heap construction for a novel piping layout.
Figure 6C:
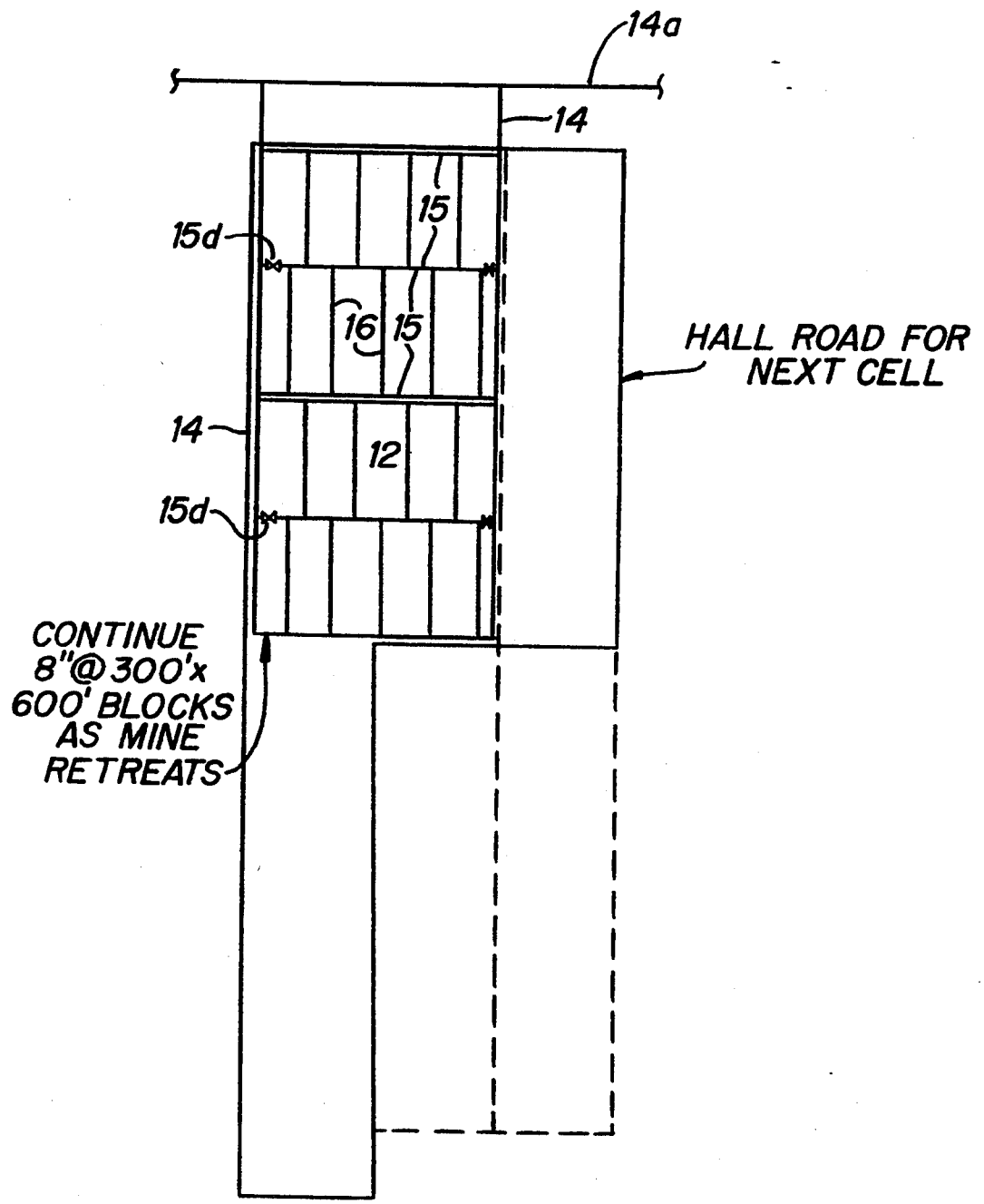

If the pad layout as shown in FIG. 6b is used in combination with the piping layout as shown in FIG. 6c then individual pads or cells are constructed as follows. An initial pad section of 450′×300′ or 450′×600′ pads are constructed from an access road. A 150′ corridor is left for constructing the next pad, but the piping layout is in cells of 300′×300′ or 300′×600′. A cross section of a typical heap is shown in FIG. 7 herein. As the next pad is built-up (as shown in FIG. 6b as area B) it is made ready for a piping layout as shown in FIG. 6c. Further, as shown in FIG. 6c the pads are built-up from left to right using the 150′ corridor.

From that point on a virtually continuous short cycle of pad construction and piping layouts continue. The corresponding leveling off of production due to the more consistent leaching of same or similar grade of ore will thus take place.

In FIG. 6c the piping sizes for a typical cell size has been given. The above piping layout also allows the cells to be dragged to the next section B, (e.g. schematically shown as in FIG. 6b). It should be noted that the 3 inch pipes are not connected to the main line pipe 14a. Although these may be connected if isolation of each cell is unnecessary or if a valve shown as 15d is being used with it.

The drip tube connector 48 of FIG. 4 or 5 is inserted in a drilled and tapped hole of ½ inch pipe threads on three inch centers in pipes 15.

As a result of the piping layout and the novel drip pipe connectors considerable flexibility in production is PATENT obtained and virtually continuous operations may take place as a heap is being leached.

While the present invention has been particularly shown and described with reference to a preferred embodiment, it will be readily apparent to those of ordinary skill in the art that various changes and modifications may be made without departing from the spirit and scope of the invention. It is intended that the claims be interpreted as including the foregoing as well as various other changes.

What is claimed is:

1. A connector used in connecting a drip tube to a header pipe in a heap leach mining percolation system comprising:
   a housing providing a fluid passageway extending therethrough between a header pipe and a drip tube;
   a nipple section formed at one end of said housing for accommodating the drip tube therearound and having a relatively short bending movement; and
   a driving collar engageable with said housing including driving means for locking said housing with respect to the header pipe and compression means for providing a compression force on the drip tube to provide for locking of the drip tube between said nipple section and said collar.

2. The connector of claim 1 wherein said housing includes a first threaded section at an end thereof opposite to the end defining said nipple section for threadably securing said housing with respect to the header pipe.

3. The connector of claim 2 wherein said first threaded section includes first external threading of relatively large diameter to absorb the bending forces within the connector.

4. The connector of claim 3 wherein the first external threading has a thread angle of approximately 3°.

5. The connector of claim 2 wherein said first threaded section has a wall thickness of from 0.25 to 0.30 inches.

6. The connector of claim 1 wherein said housing includes a second threaded section positioned between said first threaded section and said nipple section which is threadably engageable with said driving collar.

7. The connector of claim 6 wherein said second threaded section has an outer diameter greater than the outer diameter of said first threaded section and said nipple section.

8. The connector of claim 6 wherein said second threaded section includes second external threading which threadably engages internal threading of said collar to retain said collar with respect to said housing, said second external threading being formed of a sufficiently large diameter such that the bending forces of the connector are transmitted therethrough.

9. The connector of claim 8 wherein said second threaded section includes an abutment surface along a leading edge thereof extending outwardly from said nipple section.

10. The connector of claim 9 wherein said driving means includes an inwardly extending driving shoulder surface capable of impinging upon said abutment surface at a first point of contact upon rotation of said collar to urge said housing rearwardly such that said housing is secured to the header pipe.

11. The connector of claim 9 wherein said second threaded section includes a generally cylindrical chamfered edge between said abutment surface and said second external threading to provide for thread relief.

12. The connector of claim 10 wherein upon rotation of said collar, said compression means applies a compression force to the drip tube at a second point of contact prior to said shoulder surface impinging upon said abutment surface at said first point of contact.

13. The connector of claim 1 and further including gasket means being provided in a cylindrical recess of said nipple section capable of urging the drip tube outwardly from said nipple section.

14. The connector of claim 13 wherein said gasket means is an O-ring.

15. The connector of claim 1 wherein said compression means includes an inner chamber formed in said collar having a generally inwardly depending inclined surface which is capable of applying a compression force to the drip tube to provide for tension locking of the drip tube between said nipple section and said collar.

16. The connector of claim 1 wherein said nipple section is approximately 0.40 inches in length.

17. The connector of claim 1 wherein said fluid passageway is a straight bore of uniform diameter throughout said housing to reduce unwarranted stress risers and to increase the strength of said housing.

18. The connector of claim 7 wherein said fluid passageway is approximately 0.345 inches in diameter.

19. The connector of claim 1 wherein said collar is formed of a relatively heavy material to provide an enhanced locking effect upon the drip tube and to protect said relatively thin nipple section.

20. The connector of claim 1 wherein said driving collar further includes means for hand-tightening said housing with respect to the header pipe.

21. The connector of claim 20 wherein said hand-tightening means includes a plurality of lugs integrally formed with said collar and extending outwardly therefrom to provide a suitable hand grip for tightening.

22. A controlled percolation system for heap leach mining over an ore bed composed of metal laden ore deposited on an impervious pad comprising:
supply means for conducting a leaching solution adjacent to said ore bed;
a plurality of spaced apart tube means connected to said supply means for receiving said leaching solution therefrom, said tube means comprising a plurality of spaced apart header pipes connected to said tube means and drip tubes extending transversely from said header pipes; and
means for connecting each said header pipe to said drip tube, said connecting means comprising:
a housing providing a fluid passageway between said header pipe and said drip tube,
a nipple section formed at one end of said housing for accommodating said drip tube therearound and having relatively short bending movement, and
a driving collar including driving means for locking said housing with respect to said header pipe and compression means for providing a compression force on said drip tube to provide for locking of said drip tube between said nipple section and said collar.

23. The percolation system of claim 22 wherein said housing includes a first threaded section at an end thereof opposite to the end defining said nipple section for threadably securing said housing with respect to said header pipe.

24. The percolation system of claim 23 wherein said first threaded section includes first external threading of relatively large diameter to absorb the bending forces within the connector.

25. The percolation system of claim 24 wherein the first external threading has a thread angle of approximately 3°.

26. The percolation system of claim 22 wherein said housing includes a second threaded section positioned between said first threaded section and said nipple section which is threadably engageable with said driving collar.

27. The percolation system of claim 26 wherein said second threaded section includes second external threading which threadably engages internal threading of said collar to retain said collar with respect to said housing, said second external threading being formed of a sufficiently large diameter such that the bending forces of the connector are transmitted therethrough.

28. The percolation system of claim 27 wherein said second threaded section includes an abutment surface along a leading edge thereof extending outwardly from said nipple section.

29. The percolation system of claim 28 wherein said driving means includes an inwardly extending driving shoulder surface capable of impinging upon said abutment surface at a first point of contact upon rotation of said collar to urge said housing rearwardly such that said housing is secured to said header pipe.

30. The percolation system of claim 29 wherein upon rotation of said collar, said compression means applies a compression force to said drip tube at a second point of contact upon said drip tube prior to said shoulder surface impinging upon said abutment surface at said first point of contact.

31. The percolation system of claim 29 wherein said compression means includes an inner chamber formed in said collar having a generally inwardly depending inclined surface which is capable of applying a compression force to said drip tube to provide for tension locking of said drip tube between said nipple section and said collar.

32. The percolation system of claim 22 wherein said fluid passageway is a straight bore of uniform diameter throughout said housing to reduce unwarranted stress risers and to increase the strength of said housing.

33. The percolation system of claim 22 wherein said collar is formed of a relatively heavy material to provide an enhanced locking effect upon said drip tube and to protect said relatively thin nipple section.

34. The percolation system of claim 22 wherein said driving collar further includes means for hand-tightening said housing with respect to said header pipe.

35. The percolation system of claim 34 wherein said hand-tightening means includes a plurality of lugs integrally formed with said collar and extending outwardly therefrom to provide a suitable hand grip for tightening.

36. A method for connecting a header pipe and a drip tube in a heap leach mining percolation system comprising the steps of:
placing a fluid passageway formed in a housing between the header pipe and the drip tube;
accommodating the drip tube around a nipple section formed at one end of said housing;
engaging a driving collar with said housing;
rotating said collar to lock said housing with respect to the header pipe and to supply a compression force on the drip tube to lock the drip tube between said nipple section and said collar.

37. The method of claim 36 and further comprising threadably securing a first threaded section of said housing to the header pipe.

38. The method of claim 37 wherein said collar is threadably engaged with a second threaded section of said housing formed between said first threaded section and said nipple section.

39. The method of claim 38 and further including forcing an inwardly extending driving shoulder surface of said collar against an abutment surface provided along a leading edge of said second threaded section at a first point of contact to urge said housing rearwardly such that said housing is secured to the header pipe.

40. The method of claim 39 and further including applying a compression force to the drip tube by means of an inwardly depending inclined surface formed along an inner chamber of said collar to provide for tension locking of the drip tube between said nipple section and said collar.

41. The method of claim 36 and further including hand tightening said housing with respect to the header pipe by means of gripping by hand a plurality of lugs integrally formed with said collar and extending therefrom.

42. A method for constructing a controlled percolation system for percolating a leaching solution through an ore bed composed of granular metal-laden ore deposited on an impervious pad comprising the steps of:

positioning a plurality of header pipes and drip tubes transversely from each other to be capable of receiving the leaching solution therethrough;

placing a housing at each connection of said header pipe and said drip tube such that a fluid passageway thereof is capable of communicating between said header pipe and said drip tube;

accommodating said drip tube around a nipple section formed at one end of said housing;

engaging a driving collar with said housing; and rotating said collar to lock said housing with respect to said header pipe and to supply a compression force on said drip tube to lock said drip tube between said nipple section and said collar.

43. The method of claim 42 and further comprising threadably securing a first threaded section of said housing to the header pipe.

44. The method of claim 43 wherein said collar is threadably engaged with a second threaded section of said housing formed between said first threaded section and said nipple section.

45. The method of claim 44 and further including forcing an inwardly extending driving shoulder surface of said collar against an abutment surface provided along a leading edge of said second threaded section at a first point of contact to urge said housing rearwardly such that said housing is secured to the header pipe.

46. The method of claim 45 and further including applying a compression force to the drip tube by means of an inwardly depending inclined surface formed along an inner chamber of said collar to provide for tension locking of the drip tube between said nipple section and said collar.

47. The method of claim 42 and further including hand tightening said housing with respect to the header pipe by means of gripping by hand a plurality of lugs integrally formed with said collar and extending therefrom.

* * * * *